United States Patent
Ishioroshi et al.

(10) Patent No.: US 6,837,162 B2
(45) Date of Patent: Jan. 4, 2005

(54) SYSTEM AND METHOD FOR DESIGNATION PROCESS INFORMATION

(75) Inventors: Takahiro Ishioroshi, Kanagawa-ken (JP); Hirokazu Komai, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 7 days.

(21) Appl. No.: 09/986,694

(22) Filed: Nov. 9, 2001

(65) Prior Publication Data

US 2002/0054348 A1 May 9, 2002

(30) Foreign Application Priority Data

Nov. 9, 2000 (JP) ........................................ 2000-341312

(51) Int. Cl.$^7$ ............................................. B41B 27/02
(52) U.S. Cl. ...................... 101/484; 101/483; 400/61; 400/70; 400/76; 358/1.1; 358/1.14; 358/1.15
(58) Field of Search ............................ 400/61, 70, 76; 101/483, 484; 358/1.14, 1.15, 1.1

(56) References Cited

U.S. PATENT DOCUMENTS

| | | | | | |
|---|---|---|---|---|---|
| 2,908,219 | A | * | 10/1959 | Clauss ........................... | 101/44 |
| 4,472,783 | A | * | 9/1984 | Johnstone et al. ........... | 700/182 |
| 4,701,757 | A | * | 10/1987 | Schuck et al. ............... | 340/3.44 |
| 4,739,606 | A | * | 4/1988 | Cantile ......................... | 53/493 |
| 4,827,423 | A | * | 5/1989 | Beasley et al. ............... | 700/96 |
| 5,091,859 | A | * | 2/1992 | Zingher et al. ............. | 700/117 |
| 5,255,197 | A | * | 10/1993 | Iida ............................. | 700/108 |
| 5,303,336 | A | * | 4/1994 | Kageyama et al. ......... | 358/1.15 |
| 5,559,708 | A | * | 9/1996 | Turnbull et al. .............. | 700/97 |
| 5,580,177 | A | * | 12/1996 | Gase et al. .................... | 400/61 |
| 5,873,659 | A | * | 2/1999 | Edwards et al. .............. | 400/61 |
| 5,896,293 | A | * | 4/1999 | Teramoto et al. ........... | 700/111 |
| 6,003,069 | A | * | 12/1999 | Cavill ......................... | 709/205 |
| 6,067,103 | A | * | 5/2000 | Ewert et al. ................. | 347/171 |

FOREIGN PATENT DOCUMENTS

| | | | | |
|---|---|---|---|---|
| JP | 07-302111 | 11/1995 | ........... | G05B/23/02 |
| JP | 11-212627 | 8/1999 | ........... | G05B/23/02 |

* cited by examiner

*Primary Examiner*—Andrew H. Hirshfeld
*Assistant Examiner*—Jill E. Culler
(74) *Attorney, Agent, or Firm*—Sughrue Mion, PLLC (57) ABSTRACT

A designation information list 21 containing designation information is provided in a process designating apparatus 20, and a control mode table 31 which defines the actuation of the process designating apparatus, an information reader 33 which reads the designation information from the process designating apparatus 20, and a process controller 34 which acquires a prescribed control mode from the control mode table 31 to perform a prescribed process control are provided in a process control apparatus 30 so that the process designating apparatus 20 only represents the designation information and the process control apparatus 30 reads this designation information to perform the process control through the prescribed control mode.

26 Claims, 6 Drawing Sheets

| Product No. | Lot No. | Number of Products | Destination |
|---|---|---|---|
| A | x x x x x | 2000 | Tokyo |
| B | x x x x x | 1500 | Tokyo |
| B | x x x x x | 3000 | Osaka |
| . | . . . | . . . | . . . |
| . | . . . | . . . | . . . |
| . | . . . | . . . | . . . |

[Designating Information]

| | |
|---|---|
| Product No. | A |
| Lot No. | xxxxx |
| Number of Products | 1000 |
| Operating Condition | Stopping |

| Product No. | Printing Pattern | Printing Position | Size | Color | |
|---|---|---|---|---|---|
| A | ○○○ | X10,Y10 | 20 | Black | Control Mode a |
| B | △△△ | X20,Y10 | 18 | Red | Control Mode b |
| C | ××× | X50,Y60 | 32 | Red | Control Mode c |
| . | . | . | . | . | . |
| . | . | . | . | . | . |

SYSTEM AND METHOD FOR DESIGNATION PROCESS INFORMATION

BACKGROUND OF THE INVENTION

1. Field of the Invention

The present invention relates to an information designating system which designates process control, and which is applicable to a wide variety of process controls mainly in a flexible manufacturing line in a manufacturing factory, and a method for designating the process control in said system.

2. Description of Related Arts

Here, a printing process in packing and shipping lines for cosmetic containers or food containers will be exemplified and described as a typical flexible manufacturing line. In the packing and shipping lines for cosmetic containers or food containers, a prescribed number of the packed products are encased in a unit box (small box), and a prescribed number of the unit boxes are encased in a transporting box (large box), which will be shipped. The unit box and the transporting box in which the products are encased are subjected to prescribed printing including a packing ID, a lot number, and/or name of manufacturer. As just mentioned, since the printing process is executed subsequent to the packing process or encasing process of the products, a plurality of printing presses (printers) are distributed near the packing machine(s) and the encasing machine(s). Each of the printers individually carry out printing processes based on a prescribed printing mode which defines designed letters and patterned images to be printed, printing positions, sizes, colors thereof and the like.

In the case of the process control of the printers installed in a distributed manner, there is a possibility that setting errors will occur if the control data which defines the printing mode is set for a control apparatus which controls the actuation of respective printers. For this reason, a system has hitherto been constructed in which a server system unifying respective apparatuses is installed in the system and the control data to control respective control apparatuses is set all at once from the server.

However, in the case of products such as cosmetic containers and food containers manufactured in flexible manufacturing lines, new kinds of products will be often added within a relatively short period of time. Also, in such a case, due to shipping control such as increasing the number of products, printers and/or control units are often added. When the set conditions in the printing process are modified or equipment is added, various settings in the server system should be modified according to the change in the conditions etc. These modifications involve for example rewriting the designating program for controlling the printing mode, resetting of numbers for identifying the products and the printing mode for the kinds of the products, leading to the problems in terms of complicated handling, increased man-hours, and increased costs.

SUMMARY OF THE INVENTION

The present invention has been made to solve the above problems and an object of the present invention is to provide a system and a method for designating process information excelling in extensibility which can easily deal with modifications of setting conditions and the addition of equipment as in the printing process in a flexible manufacturing process.

According to the present invention which can attain the object described above, there is provided a system for designating process information comprising:

a process execution apparatus for executing a given process, a process control apparatus which executes a prescribed process control of said process execution apparatus; and a process designating apparatus which designates the process control of said process control apparatus. The process designating apparatus possesses a designation information list for the process control, and said process control apparatus possesses a control mode table including a control mode which defines the actuation of the process designating apparatus; an information reader which reads the designation information from said designation information list, and a process controller which acquires a prescribed control mode from said control mode table to perform the process control of said process execution apparatus.

In the system for designating process information, the process control apparatus reads the designation information presented from the process designating apparatus, and based on the read information, a prescribed process control is performed. Specifically, the process designating apparatus only possesses process designation information including a series of information concerning specification of the subjects to perform specific work, e.g., designation information such as kind of product, derivation, and lot number, and does not possess a series of information concerning the actuation of the process execution apparatus. The process control apparatus has the control mode table containing the control modes each defining the actuation of each of the process execution apparatuses individually. The process execution apparatus makes a query for the designation information to the process o designating apparatus at a prescribed timing, reads the control mode corresponding to the represented designation information from the control mode table, and controls the process execution apparatus according to the read control mode.

In the present invention, since the process control is carried out as described above, in the case where the modification of the setting conditions for performing the process control or the addition of the process execution apparatus(es) will be made, it is not required for the process designating apparatus to modify how to represent the designation information, but it is only required to set a control mode. The division of information for the process control into the designation information indicating the kind of products and the control mode table indicating the control mode and the distribution of the information to separate apparatuses makes it possible to deal with the extension of the system in an easy manner. It is noted that in the process control, the process control table is not referred to one after another, but is referred to only in the case where the designation information is different from the information of the prior opening, the system judges that the control mode is shifted to the next control mode, at which the process control apparatus refers to the process control table and switches the control mode to the next control mode.

There is also provided a method for designating process control in a system for designating process information comprising: a process execution apparatus for executing a given process, a process control apparatus which executes a prescribed process control of said process execution apparatus; and a process designating apparatus which designates the process control of said process control apparatus, said process designating apparatus possessing information list for the process control, said process control apparatus possessing a control mode table including a control mode which defines the actuation of the process designating apparatus, an information reader which reads the designation information from said designation information list, and a process controller which acquires a prescribed control mode from said control mode table to perform the process control of said process execution apparatus, the method comprising the following steps:

a) a step in which said control apparatus performs a prescribed process control at the presently acquired process control mode;

b) a step in which the step a) is continued until said process execution apparatus completes said prescribed process;

c) a step in which after the process execution has been completed, said process control apparatus makes a query for the designation information to said process designating apparatus;

d) a step in which, upon receiving the query for the designation information, said process designating apparatus reads the designation information from the designation information table and represents said designation information utilizing a response signal to said process control apparatus, e) a step in which said process control apparatus judges whether or not the control mode is switched to the next control mode; and f) a step in which if said process control apparatus is judged to have switched from the control mode into the next control mode, said process control apparatus acquires a prescribed control mode from the control mode table and initiates said acquired control.

DESCRIPTION OF THE EXEMPLARY EMBODIMENTS

The information designating system according to the present invention will now be described.

The present invention is directed to a system for designating process information mainly comprising a process execution apparatus for executing a given process, a process control apparatus which executes a prescribed process control of said a process execution apparatus; and a process designating apparatus which designates the process control of said process control apparatus.

The process execution apparatus(es) to be used in the present invention may be one or more and they are not specifically restricted as long as they perform a prescribed process corresponding to a process control signal from the process control apparatus. Each process is appropriately selected depending upon the objects. For example, for a process execution in which letters are printed on a carbon copy type continuous form, a dot matrix printer may be selected. For example, for a process execution in which a color printing is performed, a color laser beam printer or an inkjet printer or a combination thereof can be selected. The process execution apparatus possesses an interface for receiving a process control signal from the process control apparatus. These process execution apparatuses are freely selected in the objected lines and they may be the same or different.

The process control apparatus in the present invention is not specifically restricted as long as it has a hardware configuration, which will be described fully later on, and upon receiving process control designation information from the process designating apparatus, which will be described below, it sends a signal to the process control of the corresponding process execution apparatus. An example includes a computer system. The process control apparatus used in the system of the present invention may be one or more as occasion demands. The process control apparatus has an interface for exchanging the signal (information) to the process execution apparatus and the process designating apparatus. In an exemplary embodiment, the process control apparatus may be accommodated within the process execution apparatus.

The process designating apparatus is an apparatus making a process information designation by any of the known methods, and an example thereof is a server. The process designating apparatus is connected to the process control apparatus, e.g., via a local area network (wire or wireless). By communication through the known protocol, the process designating apparatus can make a process control designation to the process control apparatus. Each of the process control apparatus(es) and the process designating apparatuses(es) have communication means such as a modem, a terminal adaptor, or a router. They can be or are always connected via any of various lines such as switched lines, ISDN lines, and leased lines.

Consequently, the present invention is not restricted as to how to send and receive data.

In the following embodiments, the system of the present invention will be described utilizing the printing process in packing and shipping lines for cosmetic containers or food containers as a typical example. However, it should be noted that the present invention should not be restricted to such a printing process.

Figure 1:
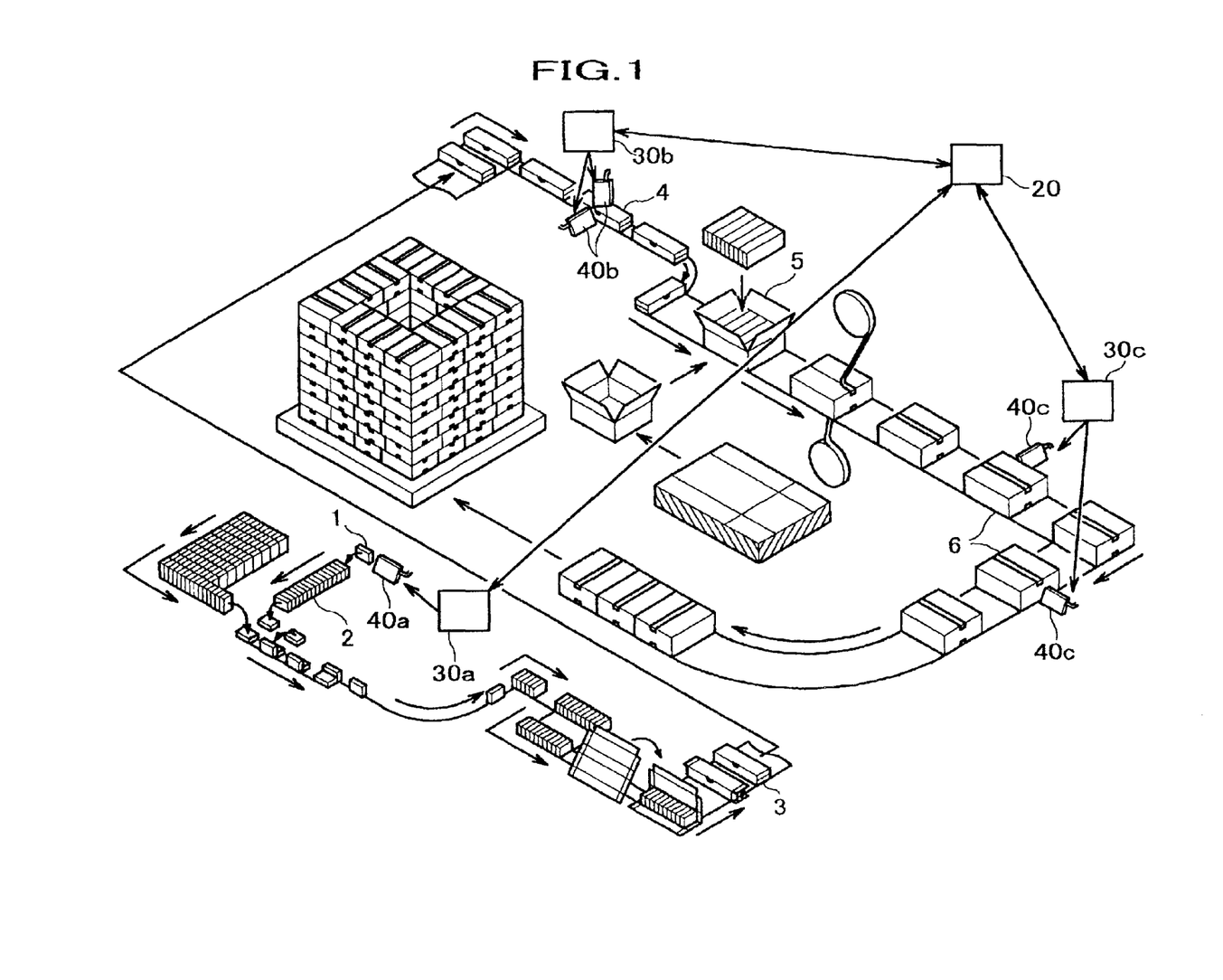
FIG. 1 is an explanatory drawing which totally explains the printing process in the packing and shipping lines for cosmetic containers, food containers or such.

FIG. 1 is an explanatory drawing which totally explains the printing process in the packing and shipping lines for cosmetic containers, food containers or such. In this figure, references 40a, 40b, and 40c each stand for a printer such as an inkjet printer (process execution apparatus), 30a, 30b, and 30c each stand for a process control apparatus, which executes a prescribed printing control of each of the printers 40a, 40b, and 40c, and 20 stands for a process designating apparatus which presents designation information concerning the process control of the process control apparatuses 30a, 30b, and 30c.

In the packing and shipping lines, first containers 1 which have been packed with a warping film are subjected to prescribed printing by means of the printer 40a to prepare printed containers 2. The printed containers 2 are encased in a unit box 3 at a prescribed unit such as ten, and the unit box 3 is subjected to a prescribed printing by means of the printer 40b to prepare a printed unit box 4. The printed unit boxes 4 are further encased in a transporting box 5 at a prescribed unit such as ten. The transporting box 5 having been printed is closed, sealed, and then is subjected to a prescribed printing by means of the printer 40c to prepare a printed transporting box 6. The printed transporting boxes 6 are aligned and piled up to be ready for shipping.

Figure 2:
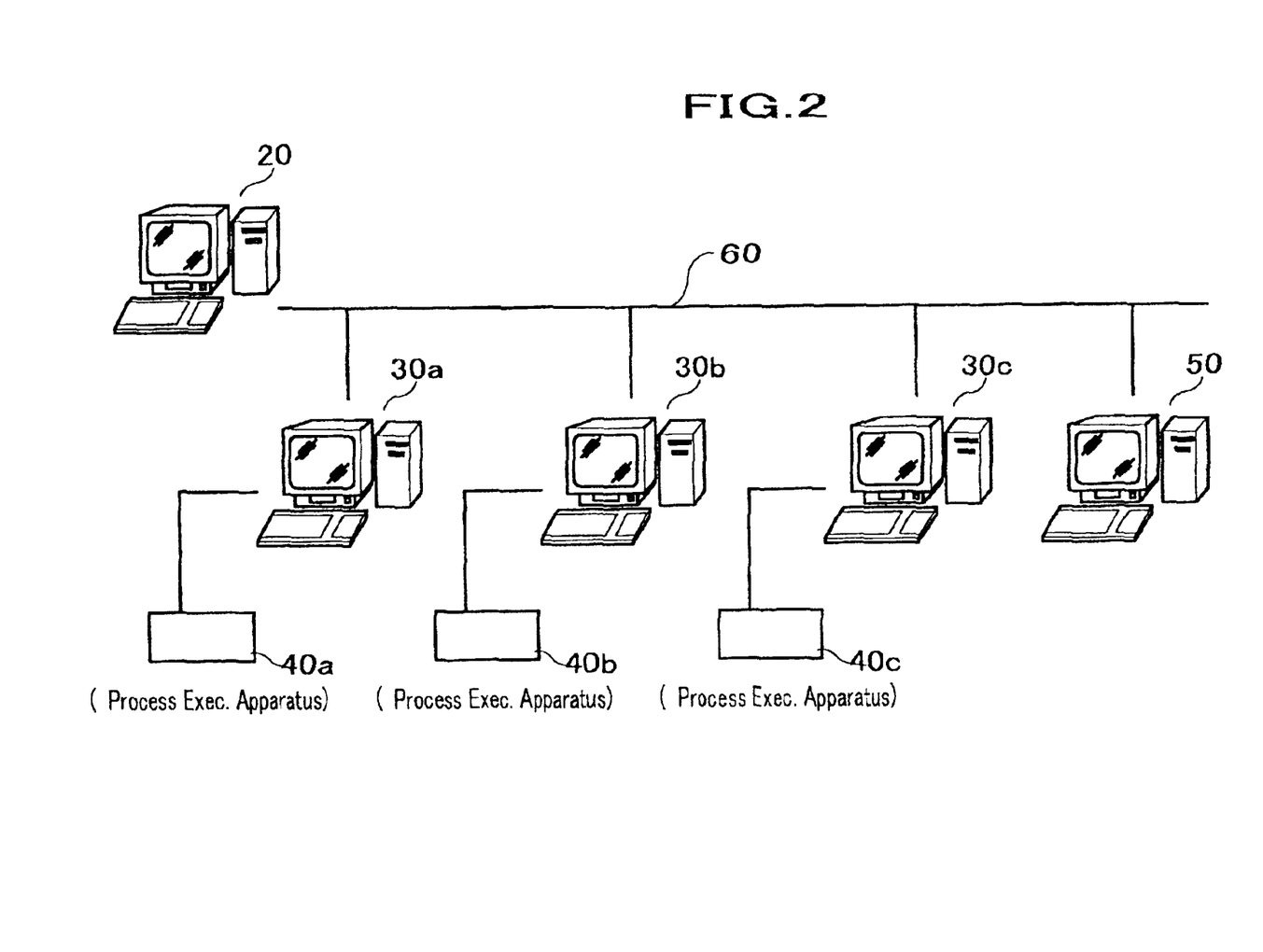
FIG. 2 is a block diagram showing the configuration of the information designating system of the present system.

Next, referring to FIG. 2, the configuration of the process information designating system according to the present invention will be described. In the drawing of FIG. 2, between the process designating apparatus 20 and each of the process control apparatuses 30a, 30b, and 30c, is connected a communication line 60. The communication line 60 may be a cable line, a wireless line or a combination thereof. An information registration apparatus 50 is an apparatus for intensively performing the registration of the designation information in the process designating apparatus 20 and the registration of the control mode in the process control apparatus 30 at one portion. The operations of the printers 40a, 40b, and 40c, which are the process execution apparatuses, are controlled by means of the process control units 30a, 30b, and 30c, respectively.

[Process Designating Apparatus]

Figure 3:
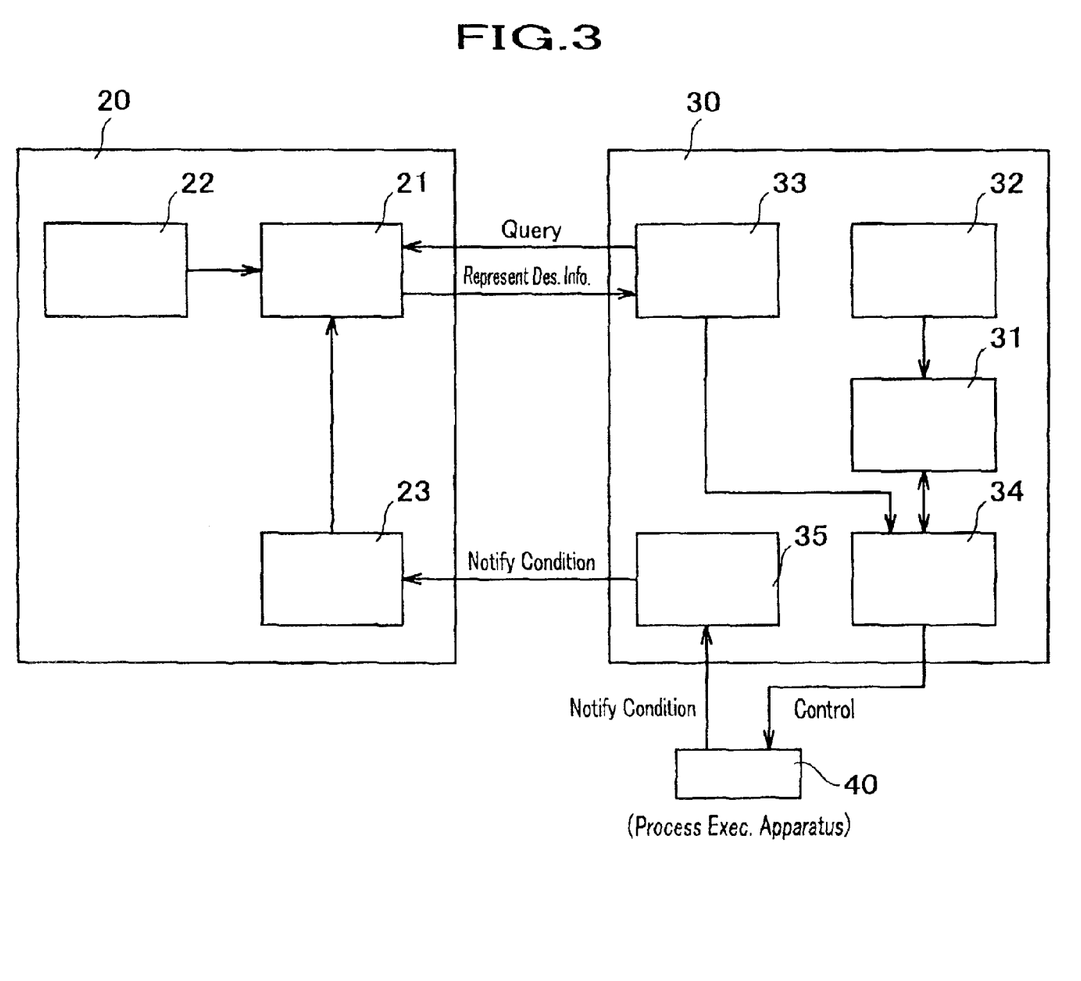
FIG. 3 is a block diagram showing the functional configuration of the information designating system of the present system.

Next, referring to FIG. 3, the process designating apparatus 20 will be described. In this figure, the process designating apparatus 20 is composed of a designation information list 21 which stores the designation information for the process control apparatus 30, and a registrar 22 (registering means) which registers the designation information. Optionally, a monitor 23 for monitoring the operating condition of the printer 40 may be included in the process designating apparatus 20.

Figure 4:
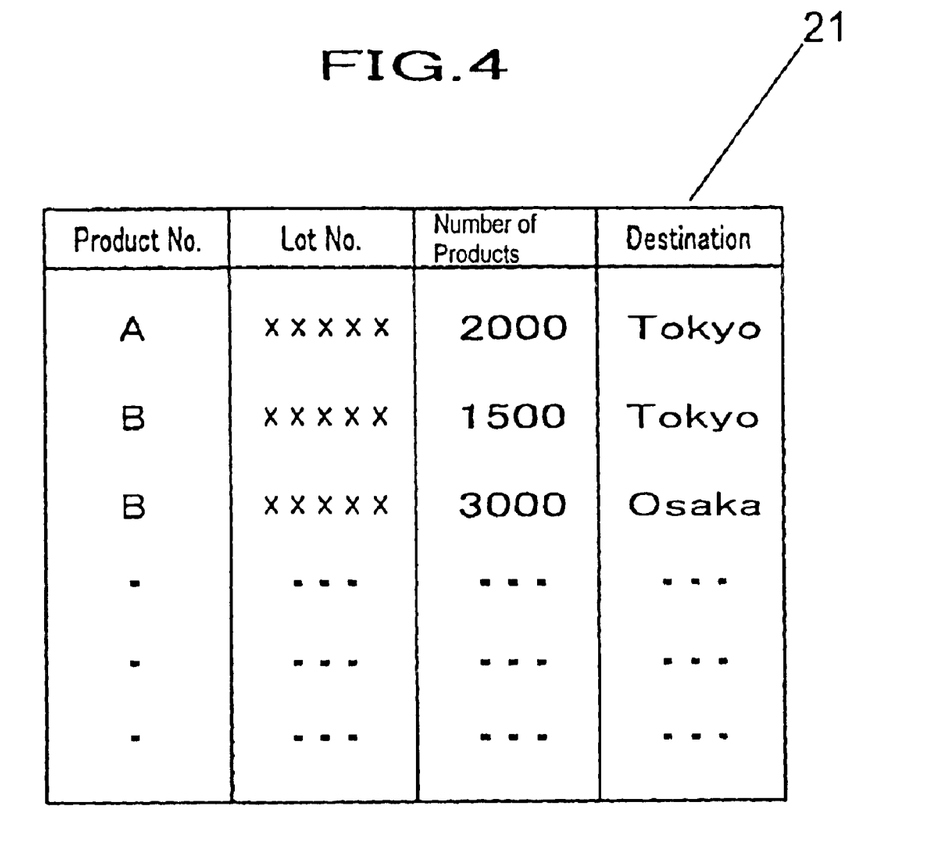
FIG. 4 shows one example of a list of the designation information.

The designation information list 21 is a list for a series of designation information required for acquiring the control mode by the process control apparatus 30. FIG. 4 shows an example of the designation information list 21. In the example shown in this figure, designation information concerning product number (shown as Product No. in the figure), a lot number (shown as Lot No. in the figure), a number of products (shown as Number of Products in the figure), destination (shown as Destination in the figure) and the like is registered. The product number concerns a number for distinguishing the kind of product to be dealt with in the printing process. The lot number concerns a number which can identify the date and place of production, parts making up the product, and the like. The number of products concerns a prescribed number of the products to be printed in a given lot. The destination concerns information for the receiver and their address, the orderer, and the like. The designation information list 21 is stored in a prescribed address within a storage device (not shown) of the process designating apparatus 20 in a readable manner.

The registrar 22 is a means for registering the designation information in the designation information list 21. The designation information including the product number, lot number, number of products, destination and the like is registered via the registrar 22 as occasion demands. In the case where a new handling product is added, the production number thereof is added. The registration of the designation information is performed via an inputting device (not shown) of the process designating apparatus 20. Taking security into consideration, it is possible that only a predetermined operator can perform this operation. In this case, the user authorization of the operator is performed as the process designating apparatus 20 requests the operator to input an ID number and a password. Also, as shown in FIG. 2, the information registration apparatus 50 can be disposed to jointly perform this operation and the registration of the control mode in the process control apparatus 30, which will be described later on.

The monitor 23 is a means for monitoring the operating condition of the printer 40. The system depicted on FIG. 3 is configured so the operating condition of the printer 40 is acquired via the process control apparatus 30. Usually, the process control apparatus 30 always catches the operating condition of the printer 40. It is more effective if the information for the operating condition of the printer 40 is received from the process control apparatus 30 rather than directly acquiring such information from the printer 40.

[Process Control Apparatus]

Next, the process control apparatus 30 will be described referring to the functional block diagram of FIG. 3. In this figure, the process control apparatus 30 is composed of a control mode table 31 including control modes, a registrar 32 for registering the control modes, a reader 33 for reading the designation information from the process designating apparatus 20, and a process controller 34, which acquires a prescribed control mode from the control mode table 31 based on the designation information having been read to perform the process control of the printer 40. The process control apparatus 30 may also be configured to possess means for notifying the operating condition of the printer 40, which catches the operating condition for the printer 40 and notifies it to the process designating apparatus 20.

Figure 6:
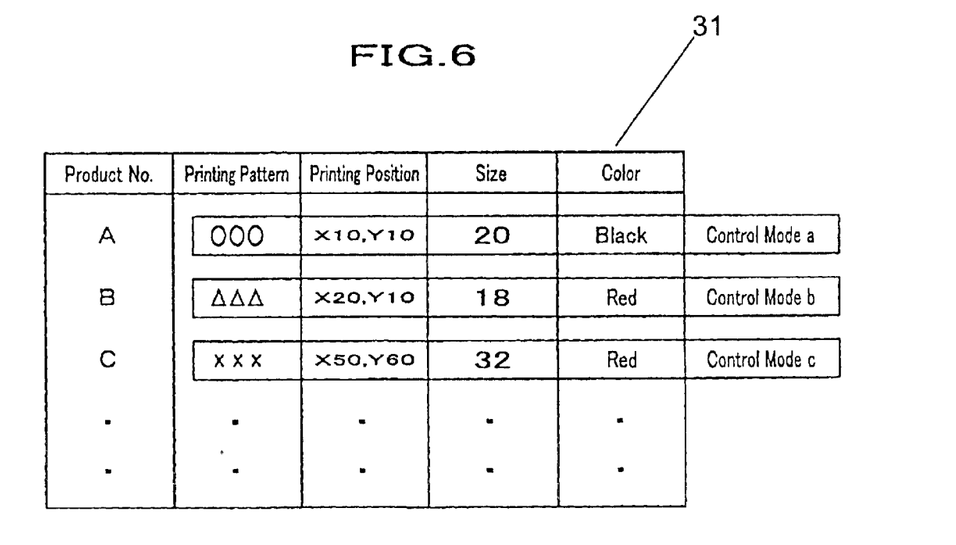
FIG. 6 shows one example of the control mode table.

The control mode table 31 is a table in which the control modes for executing the printing control of the printer 40 are registered. FIG. 6 shows an example of the control mode table. In the control mode table, the control mode, which defines printing data such as designed letters and patterned images, printing positions, sizes and colors, is registered per every product number. This control mode has been previously set so as to uniquely correspond to the product number represented from the designation information. For example, a product number "A" corresponds to a control mode "a", and a product number "B" corresponds to a control mode "b". Although not shown in the figure, different control modes in control mode table 31 are registered in the respective process control apparatuses 30, for the same product number "A". For example, the control mode in one process control apparatus 30 is registered so as to print the packing ID number, whereas the control mode in another process control apparatus 30 is registered so as to print the lot number, respectively. The control mode table 31 is stored in a prescribed address within the storage device (not shown) of the process control apparatus and can be read via the process controller 34.

The registrar 32 for the control mode is a means for registering a prescribed control mode in the control mode table 31. By means of the registrar 32 for the control mode, the control mode for printing such as designed letters and patterned images to be printed in the printer 40, printing positions, sizes, colors thereof and the like is registered in advance. If a new handling product is added, the control mode corresponding to the product concerned is newly registered. It may also be configured that the registrar 32 for the control mode and the registrar 22 for registering the designation information described above are unified with each other. For example, as shown in FIG. 2, the information registration apparatus 50 can be disposed to jointly perform the registering operations. By such a configuration, the designation information which will be registered in the process designating apparatus 20 and the control mode which will be registered in the process control apparatus 30 can be registered in such a manner as to correctly and uniquely correspond to the product number represented in the designation information. In addition, in comparison with individual registrations in respective apparatuses, the registration can be performed effectively.

The reader 33 for reading the designation information makes a query for the designation information to the process designating apparatus 20, and reads out the designation information contained in the designation information list 21. The query for the designation information is, for example, automatically performed at a predetermined given timing. The timing of the query is decided considering elements such as the shipping amount of the handling products, and the operating time, and freely varies. For example, it can be set to make a query at a given time, or to make a query after the completion of every printing. Also, for the purpose of maintenance and for precaution against unexpected trouble, it is preferable that a signal for a query can be manually sent.

The process controller 34 is a means for acquiring a prescribed control mode from the control mode table 31 based on the designation information and for executing the printing control based on the acquired control mode. The process controller 34 prepares printing data corresponding to the product number contained in the designation information and controls the printer 40 so as to perform prescribed printing.

The device 35 for notifying the operating conditions notifies the present operating condition, which is always caught, to the process designating apparatus 20 at a prescribed timing. For example, with regard to the notification of the present operating condition, the information of the operating condition may be included and the query signal for the designation information sent from the reader 33 for reading the designation information. In this case, it is also preferable for maintaining the monitoring of the operation of the total system in a matched state to notify the present operating condition to the process designating apparatus 20 if the operating condition of the printer 40 is changed.

[Configuration of Hardware]

The hardware configuration of the process designating apparatus 20 and that of the process control apparatus 30 will be described. Both the process designating apparatus 20 and the process control apparatus 30 may be composed of information process apparatuses such as personal computer systems. The information processing apparatus is composed of a control-processing unit which totally controls the whole of the apparatus having a storage device connected thereto. To the control-processing unit are connected inputting devices including a keyboard, a mouse, a scanner and the like and a display unit for use in monitoring the input/output data, output devices which output a wide variety of data, and a communication unit via an I/O controller.

The control-processing unit is composed of a central processing unit (CPU) and an internal memory, in which an operating system (OS) and any other program for executing various registrations and controls are developed. For example, in the process designating apparatus 20, there is a program for registering the designation information, and in the process control apparatus 30 there is a program for having the operating condition of the printer included in the designation information. Also, included in the process control apparatus 30 is a program for registering the control mode, a program for inquiring the designation information, a program for acquiring a prescribed control mode based on the read designation information to execute the printing control, a program for notifying the operation conditions of the printer 40 to the process designating apparatus 20, and the like.

The designation information list 21, the registrar 22 for registering the designation information, and a monitor 23 for the operating condition in the process designating apparatus 20, and the control mode table 31, the registrar 32 for registering the control mode, the reader 33 for reading the designation information and the device 35 for notifying the operating conditions in the process control apparatus 30 realize their functions respectively by means of the hardware configurations and the programs described above.

The storage device comprises a hard disk drive, a photo magnet disk or the like, and has the designation information list 21 and the control mode table 31 respectively prepared therein.

While the process designating apparatus 20 possesses a program for executing the printing control to the printer 40, this program is generally referred to as a sequence control program. Specifically, the process designating apparatus 20 is composed of a device having an information processing function and a sequence control function.

[Operation]

Figure 7:
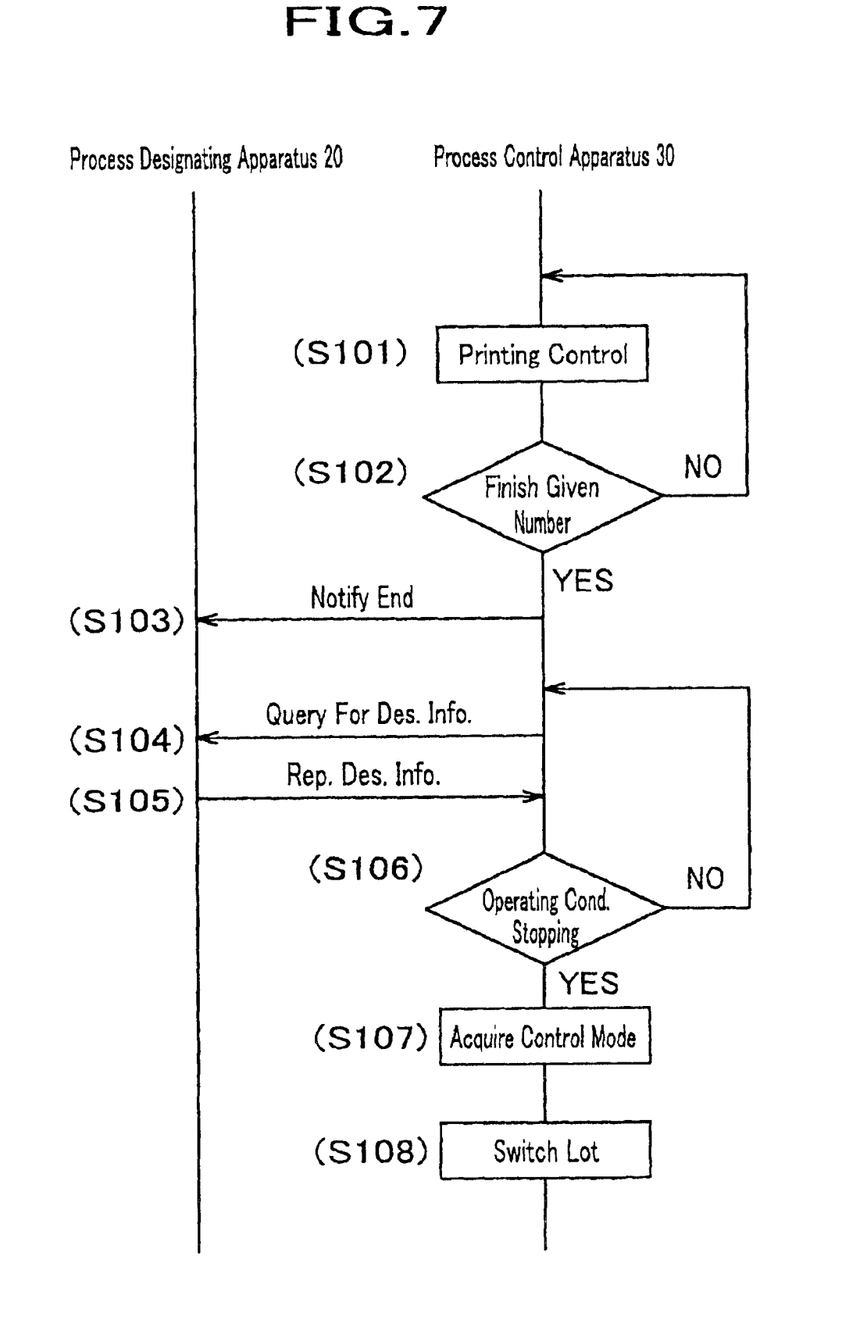
FIG. 7 is a flowchart showing the operation of the information designating system according to the present invention.

Referring to FIG. 7, the operation of the information designating system according to the present invention will be described. In the flowchart depicted on FIG. 7, the process control apparatus 30 performs a prescribed printing control to the printer at the control mode now acquired (Step 101). This printing control is continued until a prescribed number of prints have been completed (Step 102). After the completion of printing a prescribed number of prints, the process control apparatus 30 sends the notification of completion of the printing to the process designating apparatus 20 (Step 103).

When the prescribed printing has been finished, the process control apparatus 30 makes a query for the designation information to the process designating apparatus 20 (Step 104). The query may be repeatedly made even before the printing control for printing a prescribed number every prescribed period of times is completed. Upon receiving the query for the designation information, the process designating apparatus 20 reads the designation information from the designation information list 21, and represents the read designation information to the process control apparatus 30 using a response signal to the process control apparatus 30 (Step 105). At this time, it is possible to provide a specific flag showing specific conditions for the alternation, and to add the designation information to the response signal when the flag is "ON".

Figure 5:
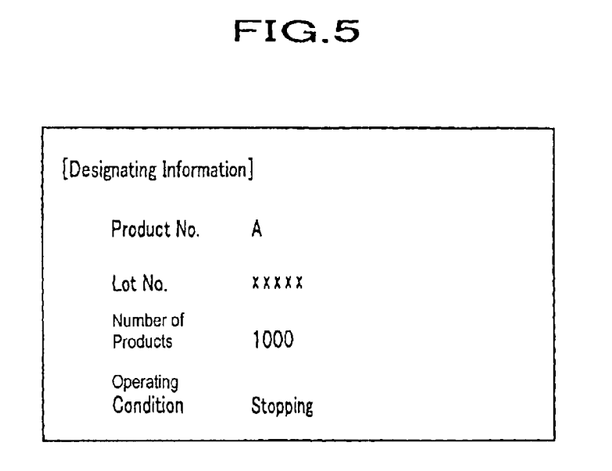
FIG. 5 shows one example of the represented designation information.

Here, an example representing the designation information is shown in FIG. 5. FIG. 5 exemplifies that the product number, lot number, number of products, and operating condition are included as designation information. The reason why the lot number should be represented is for the purpose of carrying out a lot product in an ensured and effective manner. Usually, a lot production is applied in the case where many kinds of products are continuously produced. In relatively inexpensive products such as cosmetic containers and food containers, it is important for realizing packing and shipping lines with a low cost to effectively switch one lot into another lot. For this reason, there is an advantage after the packing and shipping lines are completed (emptied) for one lot, the next lot is incorporated in terms of the fact that complicated lines are not needed and in terms of the fact that the misprinting and packing error can be prevented.

By adding the number of the products to the designation information, a prescribed number of prints can be automatically performed. Moreover, if the destination is added to the designation information, a lot production of a prescribed number of products can be made for every destination. As for the designation information, while an operator registers the production number, lot number, and number of products in the designation information list 21 according to the production plan, for example, the number of products may be individually registered to the process control apparatus 30.

In FIG. 5 the operating condition is included in the designation information for the purpose of synchronizing the switching operation in the control mode of the process control apparatus 30 with the whole of the system. The management of the switching operation of the process control apparatus 30 as described above avoids the complicated individual operations and makes it possible to initiate a lot unit of the printing in an ensured and simplified manner. It is noted that the operating condition presented from the designation information is any of "producing", "stopping", and "switching". The term "producing" means the situation where all the printers 40 execute printing, "switching" means the situation where part of the plurality of printers have completed printing and are now switching to the next control mode, and "stopping" means the situation where all the printers 40 have completed the printing and they are ready for switching to the next control mode.

Again referring to FIG. 7, when the operation condition represented from the designation information is not "stopping" in each of the process control apparatuses 30, it is judged that all the lines are not yet ready for switching. In this case, even if one process control apparatus 30 has completed a prescribed number of prints, this process control apparatus 30 awaits the switching to the next control mode until the operating condition indicates "stopping" (Step 106). Thereafter, the "stopping" is represented from the operating condition after several queries, the process control apparatus 30 acquires a prescribed control mode corresponding to the product number (Step S107), and the control through a prescribed printing data is initiated to switch lots (Step S108).

While the information designating system according to the present invention has been described by referring to the exemplary embodiment, it should be noted that the present invention is not restricted to such an embodiment, and various modifications and variants can be made without departing from the spirit and the scope of the present invention. For example, the process designating apparatus 20 may also be configured to have the functions of the process control apparatus 30. Similarly, the process control apparatus 30 may also be configured to have the functions of the process execution apparatus like the printer 40. As just mentioned, each of the apparatuses constructing the system according to the present invention may be separated as a functional unit or some of the apparatuses making up the system according to the present invention may be unified with each other.

Also, while the information designating system for a printing process in the packing and shipping lines in cosmetic containers or food containers has been described in the embodiment of the present invention, the system according to the present invention is not restricted thereto, but is applicable to a wide range of fields. Particularly, the system according to the present invention is advantageously applicable to processes where handling products are added or installation is added in a flexible manufacturing line.

What is claimed is:

1. A system for designating process information comprising:

a process execution apparatus for executing a given process, a process control apparatus which executes a prescribed process control of said process execution apparatus; and a process designating apparatus which designates the process control of said process control apparatus, said process designating apparatus possessing a designation information list for the process control, said process control apparatus possessing a control mode table including a control mode which defines the actuation of the process designating apparatus, an information reader which reads the designation information from said designation information list, and a process controller which acquires a prescribed control mode from said control mode table to perform the process control of said process execution apparatus.

2. The system according to claim 1, wherein said process designating apparatus makes a process designation via a local area network or through a communication apparatus.

3. The system according to claim 1, which has an information registration apparatus for intensively performing the registration of the designation information in the process designating apparatus and the registration of the control mode in the process control apparatus at one portion.

4. A system for designating process information according to claim 3, wherein said control mode table is referred to when designation information of a product currently being packaged is different from a next product to be packaged, wherein when packaging for the new product is required, said process designating apparatus switches to a different registered control mode.

5. A system for designating process information according to claim 3, wherein said process controller refers to the control mode table when designation information of a product currently being packaged is different from a next product to be packaged, wherein when packaging for the new product is required, said process designating apparatus switches to a different registered control mode.

6. The system according to claim 1, wherein said process designating apparatus has a monitor for monitoring the operating condition of the process execution apparatus.

7. The system according to claim 6, wherein said monitor acquires the operating condition of the process execution apparatus via the process control apparatus.

8. The system according to claim 1, wherein said information reader which reads the designation information automatically makes a query for the designation information at a predetermined given timing.

9. The system according to claim 8, wherein said timing of the query is set to make a query at a given time, or to make a query after the completion of every printing.

10. The system according to claim 1, which is applied to a process control in a flexible manufacturing line.

11. The system according to claim 10, wherein said flexible manufacturing line is a printing process in packing and shipping lines for containers.

12. A system for designating process information according to claim 10, wherein said system switches control modes based on a kind of product to be processed.

13. A system for designating process information according to claim 12, wherein said information reader of said system switches control modes based on a kind of product to be processed on the designation information list.

14. A system for designating process information according to claim 10, wherein packaging for multiple kinds of registered products can be printed one after the other in one system.

15. The system according to claim 10, wherein said process execution apparatus provides a printing process in packing and shipping lines for containers in a flexible manufacturing line.

16. A system for designating process information according to claim 10, wherein said process execution apparatus prints packaging for multiple kinds of registered products one after the other in one system.

17. A system for designating process information according to claim 1, wherein said designation information list comprises specification information of a product to be packaged.

18. A system for designating process information according to claim 1, wherein said designation information list comprises:
   a product number wherein said product number comprises information directed to a number for distinguishing a kind of product to be dealt with by the designating process information system,
   a lot number wherein said lot number comprises information to identify a date and place of production and to identify parts making up the product,
   a number of products wherein said number of products comprises information prescribing a number products to be printed in a given lot, and
   a destination wherein said destination comprises information of a receiver, a receiver's address and an orderer.

19. A system for designating process information according to claim 1, wherein said control mode table defines printing data such as designed letters, patterned images, printing positions, sizes, and colors, wherein said printing data is registered for a plurality of products to be packaged.

20. A system for designating process information according to claim 1, wherein said designation information list comprises:
   an operating condition wherein said operating condition comprises:
   a producing condition wherein a plurality of process execution apparatuses execute printing,
   a switching condition wherein at least one of said plurality of process execution apparatuses has completed printing and is ready to switch to a different control mode, and
   a stopping condition wherein the plurality of process execution apparatuses are done printing and are ready to switch to a different control mode.

21. A system for designating process information according to claim 1, wherein said designation information list is selected from at least one of:
   a product number wherein said product number comprises information directed to a number for distinguishing a kind of product to be dealt with by the designating process information system,
   a lot number wherein said lot number comprises information to identify a date and place of production and to identify parts making up the product,
   a number of products wherein said number of products comprises information prescribing a number products to be printed in a given lot, and
   a destination wherein said destination comprises information of a receiver, a receiver's address and an orderer.

22. The system according to claim 1, wherein said information reader of said process control apparatus comprises:
   a timer, wherein said information reader reads the designation information from said process designation apparatus and automatically makes a query for the designation information of the designation information list of a product at a predetermined given timing according to said timer.

23. The system according to claim 22, wherein said timer of the information reader of the process control apparatus is set to make a query at a given time, or to make a query after the completion of every printing of the designation information of the product by the process execution apparatus.

24. The system according to claim 1, wherein a process controller applies a process control in a flexible manufacturing line, wherein said flexible manufacturing line manufactures packaged products.

25. A method for designating process control in a system for designating process information comprising: a process execution apparatus for executing a given process,
   a process control apparatus which executes a prescribed process control of said process execution apparatus; and a process designating apparatus which designates the process control of said process control apparatus, said process designating apparatus possessing a designation information list for the process control, said process control apparatus possessing a control mode table including a control mode which defines the actuation of the process designating apparatus, an information reader which reads the designation information from said designation information list, and a process controller which acquires a prescribed control mode from said control mode table to perform the process control of said process execution apparatus, the method comprising the following steps:
   a) a step in which said control apparatus performs a prescribed process control at the presently acquired process control mode;
   b) a step in which the step a) is continued until said process execution apparatus completes said prescribed process;
   c) a step in which after the process execution has been completed, said process control apparatus makes a query for the designation information to said process designating apparatus;
   d) a step in which, upon receiving the query for the designation information, said process designating apparatus reads the designation information from the designation information list and presents said designation information utilizing a response signal to said process control apparatus,
   e) a step in which said process control apparatus judges whether or not the control mode is switched to the next mode; and
   f) a step in which if said process control apparatus is judged to switch the control mode into the next control mode, said process control apparatus acquires a prescribed control mode from the control mode table and initiates said acquired control.

26. A system for designating process information comprising:
   a process execution apparatus for executing a given process,
   a process control apparatus which executes a prescribed process control of said process execution apparatus; and
   a process designating apparatus which designates the process control of said process control apparatus,
   said process designating apparatus possessing a designation information list for the process control, said process control apparatus possessing a control mode table including a control mode means for defining actuation of the process designating apparatus, an information reading means for reading the designation information from said designation information list, and a process controlling means for acquiring a prescribed control mode from said control mode table to perform the process control of said process execution apparatus.

* * * * *